Sept. 29, 1959  J. A. SAFFIR  2,906,169
PROJECTION SCREEN
Filed Sept. 4, 1953  2 Sheets-Sheet 1
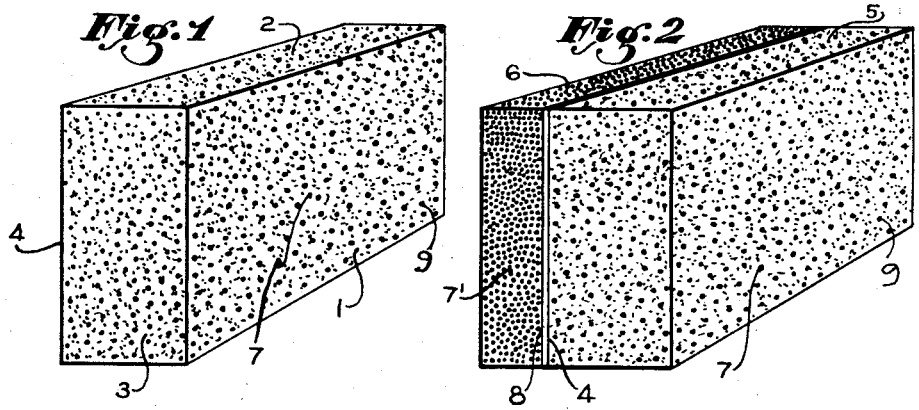
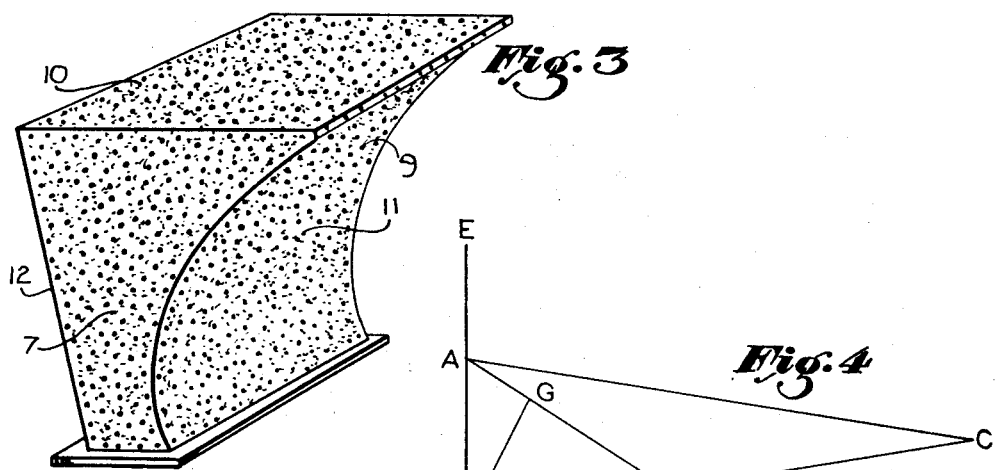
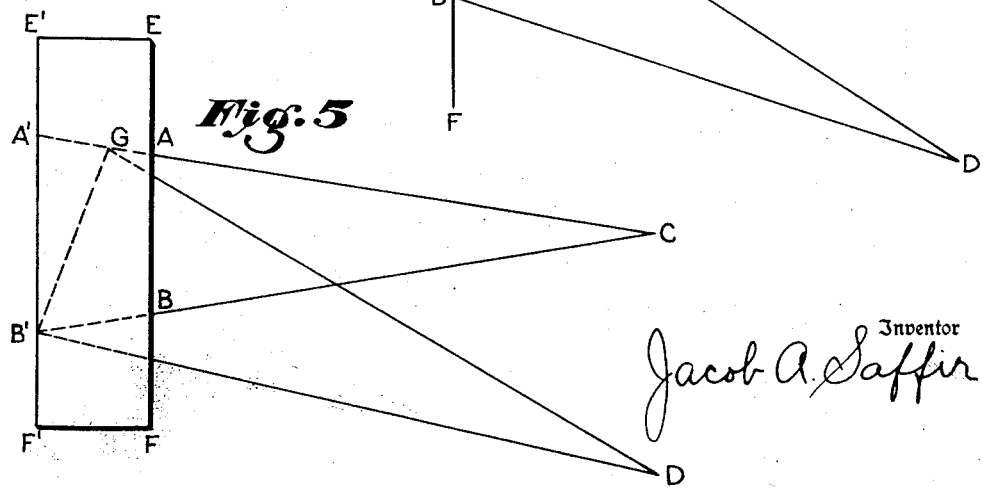
Inventor
Jacob A. Saffir Sept. 29, 1959     J. A. SAFFIR     2,906,169
PROJECTION SCREEN
Filed Sept. 4, 1953     2 Sheets-Sheet 2
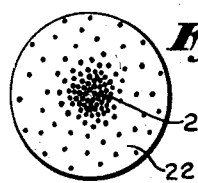
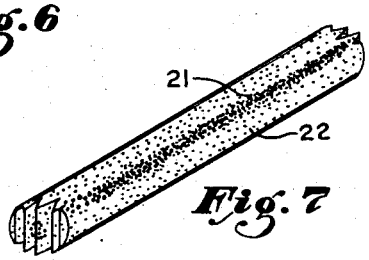
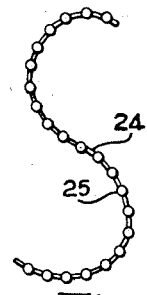
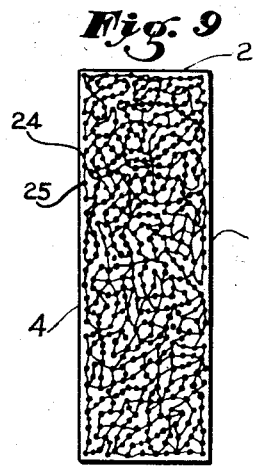
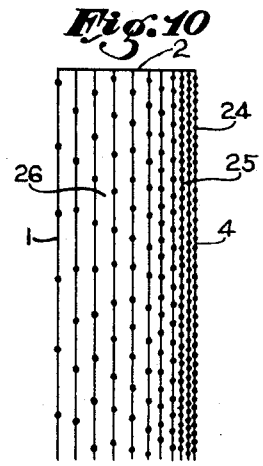
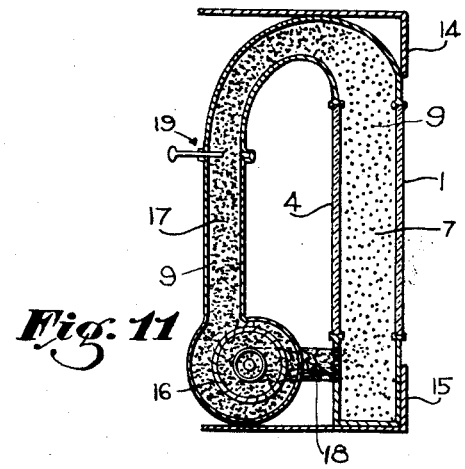
Inventor
Jacob A. Saffir

United States Patent Office 2,906,169
Patented Sept. 29, 1959

2,906,169

PROJECTION SCREEN

Jacob A. Saffir, Los Angeles, Calif.

Application September 4, 1953, Serial No. 378,528

9 Claims. (Cl. 88—28.9)

This invention relates to screens for displaying cinematographic images and other pictures, particularly as used in motion picture projection and television.

An object of this invention is to provide a screen for projection that will greatly further the illusion of naturalness in the image it produces.

Another object of this invention is to provide a screen whose image will give the impression of relief and extension into depth.

Another object of this invention is to provide a screen whose image gives the sensation of normal spacement between different planes and between various objects.

Another object of this invention is to provide a screen which gives much less distortion when viewed from the sides of an auditorium.

Another object of this invention is to provide a screen utilizable for either front, rear, or side projection, i.e., adapted for being viewed from different surfaces thereof.

A further object of this invention is to provide a screen that can modify or add a color effect to all or portions of the film being projected.

Still a further object of this invention is to provide a screen which can delete from visibility a portion or portions of the subject matter of the object or film being projected.

Another object of this invention is to provide a screen which may comprise a plurality of units, each unit contributing to the effect of naturalness.

A further object of this invention is to provide a screen showing practically no scintillation or bright spots or grain.

A still further object of this invention is to provide a screen upon which images of more than one projector can be shown at the same or at different depths in the screen, with the projectors focusing, if desired, on the same areas of the screen.

Other features, characteristics, and advantages of this invention will become apparent from the following detailed description considered in connection with the various figures of the drawings:

Figure 1 is a general perspective view taken from one end to one side of a screen showing some of the embodiments of the invention.

Figure 2 is a general perspective view taken from one end to one side of a screen showing a two chambered screen.

Figure 3 is a general perspective view taken from one end to one side of a screen showing another modification of the invention.

Figure 4 is a sketch illustrating horizontal angle distortion with prior curtain-like screens.

Figure 5 is a sketch illustrating horizontal angle improvement with the screen of this invention.

Figure 6 is a cross section of one desirable embodiment of the particles that may be used in the screen for affording the reflective characteristics.

Figure 7 is a cross section of another modification of particle embodying the reflective elements of the screen.

Figure 8 is a cross section through one of the filaments embracing the reflective particles adapted for the screen modifications shown in Figures 9 and 10.

Figure 9 is a section of a screen utilizing filament or strand type supports for the reflective particles or nodules.

Figure 10 is illustrative of another modification of the invention showing a further type of orientation applicable to the filament or strand means embodying the reflective particles or nodules in the screen body.

Figure 11 is an additional section through a screen embodiment showing means for keeping the various particles in motion.

Like reference numerals refer to like parts throughout the several views.

Screens heretofore have been principally flat and curtain-like and the resultant reflections, although having fair dimensions of width and length when viewed from a proper position, are generally lacking or comparatively deficient in the backward extension or depth dimensions of the image.

The improved screen of the present invention is not curtain-like or of generally planar configuration, as contemplated by the prior art. On the contrary, it comprises a structure wherein the walls thereof define a hollow or volumetric enclosure adapted to retain predetermined types of particles therein and resembles or simulates the area or space wherein the photography for obtaining the image was actually effected, thereby embracing in the screen dimensions adapted to afford a projected image manifesting a naturalness, with respect to its depth as well as width and length or height, that is suggestive of the natural visual appearance applicable to the objects per se, as well as relative to each other, within the space wherein the said image was effected.

In its simplest modification, the screen comprises a hollow cuboidal enclosure or compartment filled with or consisting of materials which permit projected light to enter to various depths before complete projection so that the projection when viewed emanates from an area somewhere between the front and rear of the screen which may differ within the scope of the invention, dependent upon the face from which the screen is viewed. This area can, of course, vary from a fraction of an inch to many feet.

The screen area may be filled with innumerable discrete particles either in motion or stationary, as illustratively indicated in the figures of the drawings. Each of these myriads of particles desirably has a relatively high reflecting area and a non-reflecting or lesser reflecting area, as further described hereinbelow.

Accordingly the first layers of particles will only partially reflect. Complete reflection will result from the action of a great number of layers of particles, thereby affording a cumulative reflective function.

In a thin screen where reflection is required from a smaller number of particles, these particles can be constructed of or be coated with a very reflective layer.

By using a screen of this type in which there are myriads of non-reflective areas, a far greater contrast or tonal value is obtained and because of the absence of harsh reflections, viewing is more pleasant and much easier on the eyes.

Figure 1 illustrates an embodiment of this invention. At 1, is the anterior surface or that area facing the audience. This comprises a clear translucent surface of cellophane or glass or any such similar substance. This same material can also form the top, 2, sides, 3, and rear wall, 4. The interior of the screen area is shown at 7.

However, the rear wall, 4, may be painted a dull black on its inner surface so as not to reflect any rays that reach it, where it is desired to restrict the reflection to that of the particles, which may be desirable with screens having a substantial distance between the front and rear walls thereof. The minute reflecting bodies, 9, are dispersed within the interior, 7.

If, however, the screen is made quite thin and it is desired to use the rear surface of the screen to help reflect, then it can be painted a dull white or be made from aluminum of some other highly reflective material. This rear surface may also be colored or designed to bring out a special effect.

Where the screen is used for rear projection, both front and rear surfaces will be constructed of clear material or at least translucent material.

Where great depth for reflection is desired, the screen may have two or more compartments as illustrated in Figure 2.

At 5 is the front screen and 6 is the rear screen. In this case, the rear wall 4, of the anterior screen compartment is generally of clear non-reflective material. However, it can be tinted or given special treatment or design. Also, 4 can be the anterior wall of the second compartment 6, or, there can be a separate wall 8 so that these two screens can be separated if necessary. The entire interior spaces 7 and 7' are screen enclosures or compartments adapted for utilization supplementary to or independently of each other.

Screen compartment 7 may have smaller or larger particles or less particles or less reflective particles than screen compartment 7' so that depth of reflection may be controlled by the reflective properties of the more anterior chamber.

These screens may have any shape, depending on the results desired. Figure 3 shows a screen that gets thicker towards the top, 10, and has a curving anterior surface 11, and sloping posterior surface, 12; the screen compartment, 7, being irregular in shape.

By changing thickness of an area of the screen, one can alter the density of the reflected image and therefore of the resulting picture. Some believe that most denseness should be towards the bottom, whereas for some scenes it is felt that equal denseness throughout is desirable. By turning or reversing a screen such as is illustrated in Figure 3, so that 10 becomes the base thereof, one can obtain either of these conditions.

Figure 4 illustrates diagrammatically a flat screen EF and a viewer seated at C, which is a normal position for screen EF and where the image AB will appear to have normal width.

Should, however, the viewer sit at position D, slightly to the side of C, he will see the image BG which is distorted in width. Large areas of some auditoriums are therefore rendered very unsatisfactory for viewing screen images.

With the screen of the present invention, as illustrated in Figure 5, reflection will be from the entire screen area EE'FF', the front of the screen being EF, the rear E'F'.

Not only does the observer at C see a normal width in projection but the observer at D sitting at one side sees the image B'G which is so close to the normal that no discrepancy is evident to him.

Figure 6 comprises a cross-sectional illustration of one of the particles that fill the screen areas when individual particles are used. These may be spherical, as contemplated by Fig. 6, or elongated rods such as are shown in Figure 7. The said particles may vary in size from small globules of a diameter less than the wave lengths of light to as large as desired. These globules or particles may be of any shape, regular or irregular and may be uniformly distributed or for special effects, non-uniformly distributed.

The particles may also vary in their index of refraction of light and may be made of any reflecting material or pigment or from such well known substances as ethyl cellulose, benzyl cellulose, or particles of cellophane properly dyed and treated.

Thus with illustrative reference to Figs. 6 and 7, the center portions of these particles desirably may be more densely supplied with the more light reflective elements 21 than the outer portion of the core or body, 22, which is more translucent and less reflective than the said reflective elements 21 shown embedded therein. These less reflective areas help greatly to create contrast and relieve harshness so that the resultant images are quite natural and life like. These particles are also suitable for use in television screens.

Figure 8 illustrates another type of reflector means that may be used in the construction of a screen. This is composed of a flexible translucent thread-like strand or filament, 24, made of cellulose or nylon or methyl methacrylate or any translucent material, upon which have been deposited at close intervals, small nodules or particles 25, of reflective material.

Figure 9 illustrates a screen whose interior is filled with the type of reflector means illustrated in Figure 8. This type is also suitable for television screens.

The screen in Figure 10 is composed of a top member 2, from which hang these strings or filaments 24 of reflector particles or nodules 25. These strands can hang close together and touch or be separated by a small space, 26, between each strand. If desired, the reflector nodules can be close together or far apart or a combination of both as illustrated. At 1, the anterior portion of the screen, the nodules are further apart than at 4, the rear of the screen. This screen will reflect an image manifesting the characteristics of considerable depth or relief and enhanced normalcy of appearance as well as a minimum distortion of the image, similarly to the desirable attributes of the other modifications of the invention illustratively shown and described herein.

In Figure 11 is a screen composed of an outer translucent casing, the anterior portion of which is 1, while the back of the screen is 4. In this screen it is possible to keep the reflecting particles 9, in constant motion or in temporary motion. The screen compartment 7, is in communication with chamber 17, having a rotating blower mechanism 16, which draws particles 9 through the screen area or enclosure 7 forcing it upwardly through chamber 17 back into the screen area 7.

At 19 is a gate or valve, which, when closed, stops the entry of particles into the screen area 7. A series of these ducts 17, and gates 19, and blower mechanism 16, along the rear of a screen permits the removal of one type of particle and the introduction, as desired, of a completely different type, size, or color. One closes one gate and open another. This is a simple way to produce various effects. At 14 is shown an opaque curtain to hide parts of this mechanism that should be invisible. Similarly, the wall 4, can be painted with an opaque layer to shield from view what is behind it.

If it is desired to black out a portion of the screen, the valve 19 is closed and as the particles are drawn down by the vacuum effect produced by the blower 16, the top part of the screen will begin blacking out. Where there are a series of these blowers small portions of the screens can be blacked out to produce various effects. By adjusting the speed of the blower, the effect can be shortened or prolonged.

The term "screen" is used herein and in the claims as meaning an area used for displaying motion pictures, slides, television, and the like. The claims are, therefore, to be interpreted broadly with this in mind; and while I have, for purpose of illustration, shown and described several embodiments, it should be understood that my invention may be embodied in other forms within the spirit and scope of the appended claims, in which I claim:

1. A projection screen device comprising a plurality of walls defining a hollow enclosure of predetermined volumetric capacity, one or more walls comprising a viewing surface of transparent material, and a plurality of discrete light-reflecting particles positioned within the said enclosure to provide a cumulative light-reflective body the said screen device embodying dimensions of depth, width, and length adapted to cause an image projected thereon to have an illusion of depth, said light reflective particles comprising a translucent body, the inner portion thereof containing a concentration of light reflecting elements affording maximum light reflection, and the outer portion of said particles being of relatively lesser light reflecting character.

2. A projection screen device comprising front, rear, side and bottom walls defining a hollow enclosure of predetermined volumetric capacity, the front wall thereof comprising a viewing surface of transparent material, and a plurality of discrete light-reflecting particles positioned within the said enclosure to provide a cumulative light-reflecting body the said screen device embodying dimensions of depth, width, and length adapted to cause an image projected thereon to have an illusion of depth, said discrete light reflecting particles being minute translucent bodies having an inner portion that affords a maximum light reflecting property and an outer portion of relatively lesser light reflective character, said discrete particles positioned within the screen to provide cumulative light reflective properties.

3. A projection screen as in claim 2, including a front wall, a rear wall, side walls, a bottom wall, and a top wall, all of the said walls being of a transparent material.

4. A projection screen as in claim 2, wherein the maximum light-reflective characterstics are manifested within the enclosure, and the surface light-reflective characteristics are comparatively less.

5. A projection screen as in claim 2, wherein the walls define a cuboidal enclosure, and wherein the inner rear wall surface is coated to obviate reflectivity.

6. A projection screen as in claim 2, wherein the light-reflecting particles each comprise a translucent body, the inner portion of the said body manifesting maximum light-reflecting characteristics and the outer position thereof manifesting comparatively reduced light-reflective characteristics.

7. A projection screen as in claim 6, wherein each light-reflecting particle comprises a translucent spherical body, the inner portion thereof containing a concentration of light-reflecting elements affording maximum light-reflective properties, and the outer portion of said particle being of relatively lesser light-reflective character.

8. A projection screen as in claim 2, provided with a top wall wherein at least the front and rear walls are of translucent material, at least one of the said walls being of convex configuration, and the width of the screen between the said convex wall and the opposing wall is of varying dimension between the bottom and top walls of the said screen, the said screen being adapted for reversal of the relative positions of the top and bottom walls by reversing the screen per se.

9. A projection screen as in claim 8, wherein the front wall is of convex configuration and the rear wall manifests an inclined disposition between the top and bottom walls.

References Cited in the file of this patent

UNITED STATES PATENTS

| | | |
|---|---|---|
| 1,356,140 | Hall | Oct. 19, 1920 |
| 1,650,341 | Goldstein | Nov. 22, 1927 |
| 1,747,425 | Cawley | Feb. 18, 1930 |
| 1,808,725 | De Francisco | June 2, 1931 |
| 1,813,559 | Bouchspies | July 7, 1931 |
| 1,995,964 | Darimont | Mar. 26, 1935 |
| 2,017,705 | Sproxton | Oct. 15, 1935 |
| 2,178,996 | Land | Nov. 7, 1939 |
| 2,180,113 | Land | Nov. 14, 1939 |
| 2,210,806 | Etbauer | Aug. 6, 1940 |
| 2,277,007 | Von Ardenne | Mar. 17, 1942 |
| 2,287,556 | Land | June 23, 1942 |
| 2,481,621 | Rosenthal | Sept. 13, 1949 |
| 2,543,793 | Marks | Mar. 6, 1951 |
| 2,584,441 | Fredendall | Feb. 5, 1952 |

FOREIGN PATENTS

| | | |
|---|---|---|
| 461,600 | France | Jan. 6, 1914 |
| 76,694 | Switzerland | Jan. 16, 1918 |
| 546,366 | Great Britain | July 9, 1942 |